US008892843B2

(12) United States Patent
Acuna et al.

(10) Patent No.: US 8,892,843 B2
(45) Date of Patent: *Nov. 18, 2014

(54) CREATION OF LOGICAL UNITS VIA BORROWING OF ALTERNATIVE STORAGE AND SUBSEQUENT MOVEMENT OF THE LOGICAL UNITS TO DESIRED STORAGE

(71) Applicant: International Business Machines Corporation, Armonk, NY (US)

(72) Inventors: Jorge D. Acuna, Tucson, AZ (US); Fahad Mahmood, Pune (IN); Dhaval K. Shah, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/142,480

(22) Filed: Dec. 27, 2013

(65) Prior Publication Data

US 2014/0115288 A1    Apr. 24, 2014

Related U.S. Application Data

(63) Continuation of application No. 13/784,169, filed on Mar. 4, 2013, now Pat. No. 8,650,378, which is a continuation of application No. 13/028,668, filed on Feb. 16, 2011, now Pat. No. 8,639,906.

(51) Int. Cl.
| G06F 13/00 | (2006.01) |
| G06F 13/28 | (2006.01) |
| G06F 3/06 | (2006.01) |
| G06F 12/06 | (2006.01) |
| G06F 12/02 | (2006.01) |

(52) U.S. Cl.
CPC ............ *G06F 3/0647* (2013.01); *G06F 3/0689* (2013.01); *G06F 3/0652* (2013.01); *G06F 3/0608* (2013.01); *G06F 12/0653* (2013.01); *G06F 12/023* (2013.01); *G06F 3/0619* (2013.01); *G06F 3/0665* (2013.01); *G06F 3/067* (2013.01); *G06F 3/0605* (2013.01)
USPC ..... 711/171; 711/170; 711/114; 711/E12.084

(58) Field of Classification Search
None
See application file for complete search history.

(56) References Cited

U.S. PATENT DOCUMENTS

| 7,231,504 B2 | 6/2007 | Kashyap et al. |
| 7,529,471 B2 | 5/2009 | Boston et al. |

(Continued)

FOREIGN PATENT DOCUMENTS

JP    2006-227928    8/2006

OTHER PUBLICATIONS

English Abstract of Japanese Patent Publication No. 2006-277928, published Aug. 31, 2006.

(Continued)

*Primary Examiner* — Eric S Cardwell
(74) *Attorney, Agent, or Firm* — Rabindranath Dutta; Konrad, Raynes, Davda and Victor LLP (57) ABSTRACT

A computational device receives a request to create a logical unit. In response to determining that adequate space is not available to create the logical unit in a first type of storage pool, a determination is made as to whether a first indicator is configured to allow borrowing of storage space from a second type of storage pool. In response to determining that the first indicator is configured to allow borrowing of storage space from the second type of storage pool, the logical unit is created in the second type of storage pool The logical unit is moved from the second type of storage pool to the first type of storage pool, in response to determining that free space that is adequate to store the logical unit has become available in the first type of storage pool.

12 Claims, 8 Drawing Sheets

(56) References Cited

U.S. PATENT DOCUMENTS

| | | | |
|---|---|---|---|
| 7,689,986 B2 | 3/2010 | Monnie et al. | |
| 2008/0208930 A1* | 8/2008 | Kubo et al. | 707/204 |
| 2009/0276588 A1* | 11/2009 | Murase | 711/160 |
| 2009/0307432 A1 | 12/2009 | Fleming | |
| 2012/0210060 A1 | 8/2012 | Acuna et al. | |
| 2013/0166842 A1 | 6/2013 | Acuna et al. | |

OTHER PUBLICATIONS

English Machine Translation of Japanese Patent Publication No. 2006-277928, published Aug. 31, 2006.

R.Buyya, "Parmon: a Portable and Scalable Monitoring System for Clusters", Software Practice and Experience, 2000, pp. 1-17.

A. Messer, et al., "Towards a Distributed Platform for Resource-Constrained Devices", Hewlett-Packard Company, Feb. 4, 2002, pp. 1-15.

C,A, Waldspurger, "Memory Resource Management in VMware ESX Server", USENIX Association, 5th Symposium on Operating Systems Design and Implementation, 2002, pp. 181-194.

"Method for Borrowing Memories from Adjacent Processor Cores", IBM Corp., IP.com No. IPCOM000171196D, Jun. 2, 2008, pp. 1-3.

T. Okuda et al., "Remote Swap Management Framework in a Virtual Machine Cluster", IEEE, 2010 IEEE 3rd International Conference on Cloud Computing, 2010, pp. 546-547.

Preliminary Amendment filed Mar. 5, 2013, pp. 1-6, for U.S. Appl. No. 13/028,668, filed Feb. 16, 2011.

Office Action dated May 9, 2013, pp. 18, for U.S. Appl. No. 13/028,668, filed Feb. 16, 2011.

Response dated Aug. 9, 2013, pp. 10, to Office Action dated May 9, 2013, pp. 18, for U.S. Appl. No. 13/028,668, filed Feb. 16, 2011.

Notice of Allowance dated Sep. 10, 2013, pp. 22, for U.S. Appl. No. 13/028,668, filed Feb. 16, 2011.

Preliminary Remarks filed Mar. 5, 2013, pp. 1-2, for U.S. Appl. No. 13/784,169, filed Mar. 4, 2013.

Office Action dated May 9, 2013, pp. 18, for U.S. Appl. No. 13/784,169, filed Mar. 4, 2013

Response dated Aug. 9, 2013, pp. 11, to Office Action dated May 9, 2013, pp. 18, for U.S. Appl. No. 13/784,169, filed Mar. 4, 2013.

Notice of Allowance dated Sep. 30, 2013, pp. 21, for U.S. Appl. No. 13/784,169, filed Mar. 4, 2013.

* cited by examiner

CREATION OF LOGICAL UNITS VIA BORROWING OF ALTERNATIVE STORAGE AND SUBSEQUENT MOVEMENT OF THE LOGICAL UNITS TO DESIRED STORAGE

CROSS-REFERENCE TO RELATED APPLICATIONS

This application is a continuation of application Ser. No. 13/784,169 filed on Mar. 4, 2013, wherein application Ser. No. 13/784,169 is a continuation of application Ser. No. 13/028,668 filed on Feb. 16, 2011, and wherein application Ser. No. 13/784,169 and application Ser. No. 13/028,668 are incorporated herein by reference in their entirety.

BACKGROUND

1. Field

The disclosure relates to a method, a system, and a computer program product for the creation of logical units via borrowing of alternative storage and the subsequent movement of the logical units to desired storage.

2. Background

Storage subsystems may be used to store data in a storage area network (SAN). In certain configurations of such storage subsystems, logical units (LUN) of varying storage capacities may be created in a plurality of storage pools. The plurality of storage pools may be configured in a plurality of Redundant Array of Independent Disks (RAID) configurations. For example, some storage pools may be configured as RAID-1 and other storage pools may be configured as RAID-5. In a storage area network, different RAID configurations may provide different levels of performance, data availability and redundancy.

The amount of data stored in such storage subsystems may increase in amount over time. As a result, in certain situations, such storage subsystems may run out of space. If a process attempts to create some LUNs on a storage pool of a desired RAID level for data storage, and the storage subsystem runs out of space, the process may have to be stopped. Considering the amount of time and effort needed to identify and erase data of a lower importance to make room for data of a higher importance, such disruptions in the process for creating LUNs are undesirable.

SUMMARY OF THE PREFERRED EMBODIMENTS

Provided are a method, a system, and a computer program product in which a computational device receives a request to create a logical unit, wherein associated with the request is a first type of storage pool in which creation of the logical unit is desired. In response to determining that adequate space is not available to create the logical unit in the first type of storage pool, a determination is made as to whether a first indicator is configured to allow borrowing of storage space from a second type of storage pool. In response to determining that the first indicator is configured to allow borrowing of storage space from the second type of storage pool, the logical unit is created in the second type of storage pool and a listener application is initiated. The listener application determines that free space that is adequate to store the logical unit has become available in the first type of storage pool. The logical unit is moved from the second type of storage pool to the first type of storage pool, in response to determining, via the listener application, that free space that is adequate to store the logical unit has become available in the first type of storage pool.

In further embodiments, in response to determining that the first indicator is configured to not allow borrowing of storage space from the second type of storage pool, a determination is made as to whether a second indicator is configured to allow creation of the logical unit in the second type of storage pool. Furthermore, in response to determining that the second indicator is configured to allow creation of the logical unit in the second type of storage pool, the logical unit is created in the second type of storage pool.

In additional embodiments, in response to determining that the second indicator is not configured to allow creation of the logical unit in the second type of storage pool, a message is sent to indicate that the logical unit cannot be created.

In yet additional embodiments, a determination is made as to whether adequate space is available to create the logical unit in the first type of storage pool. In response to determining that adequate space is available to create the logical unit in the first type of storage pool, the logical unit is created in the first type of storage pool.

In certain embodiments, the first type of storage pool is of a higher numbered Redundant Array of Independent Disks (RAID) level configuration in comparison to the second type of storage pool.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain embodiments allow storage space to be borrowed from an alternative type of storage pool when the desired type of storage pool is unavailable. The borrowed storage space is used to store a logical unit in the alternative type of storage pool. A listener application is initiated when the storage space is borrowed. The listener application determines when an adequate amount of storage space has become free in the desired type of storage pool. When an adequate amount of storage space becomes free in the desired type of storage pool, the logical unit is moved from the alternative type of storage pool to the desired type of storage pool.

In certain embodiments, the desired type of storage pool is of a higher numbered RAID level configuration in comparison to the alternative type of storage pool. For example, the desired type of storage pool may be of type RAID-5 and the alternative type of storage pool in which the logical unit is stored may be of type RAID-1, when RAID-5 type of storage pools do not have adequate space to store the logical unit.

Exemplary Embodiments

Figure 1:
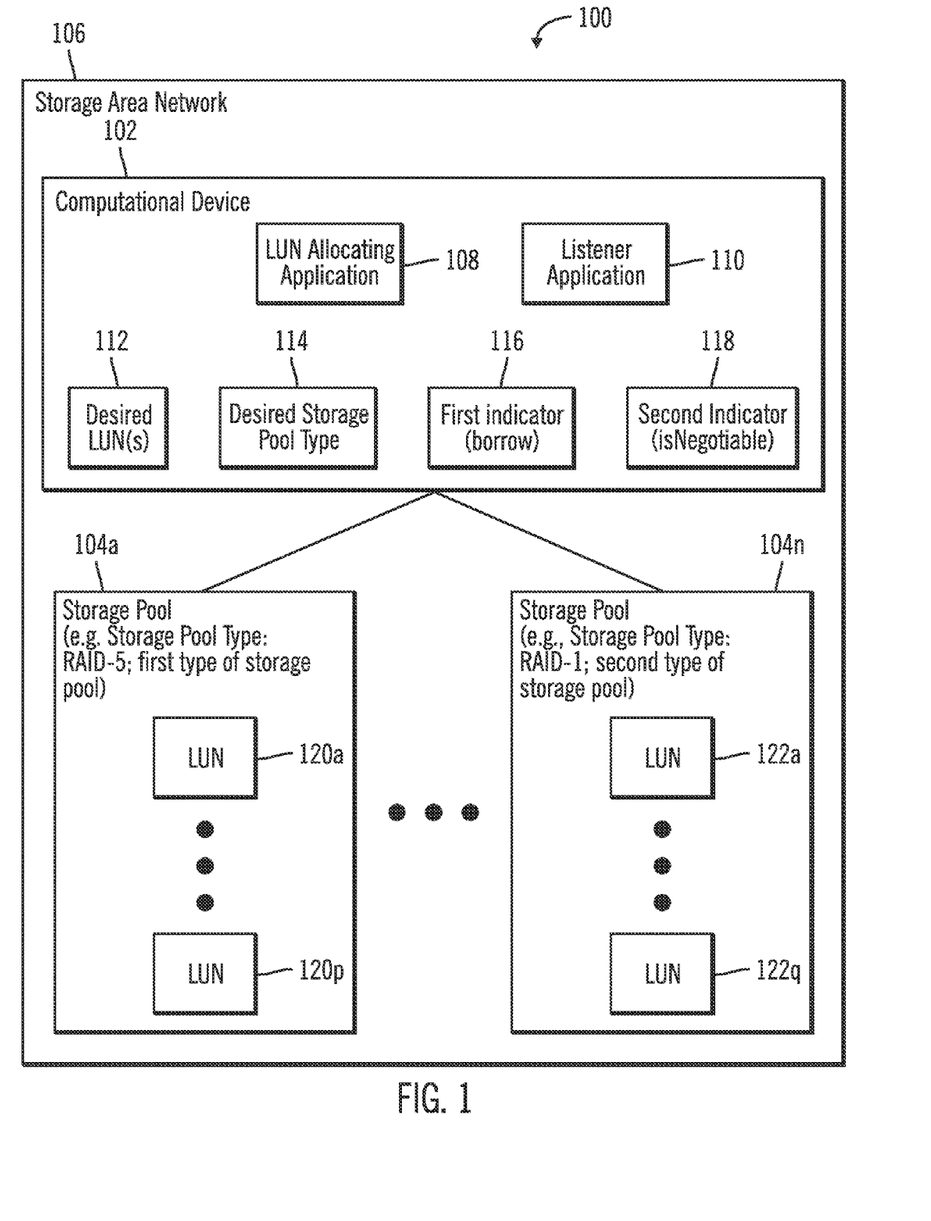
FIG. 1 illustrates a block diagram of a computing environment that includes a computational device coupled to a plurality of storage pools in a storage area network, in accordance with certain embodiments.

FIG. 1 illustrates a block diagram of a computing environment 100 that includes a computational device 102 coupled to a plurality of storage pools 104a . . . 104n in a storage area network 106, in accordance with certain embodiments. The computational device 102 may be any suitable computational device including those presently known in the art, such as, a personal computer, a workstation, a server, a mainframe, a hand held computer, a palm top computer, a telephony device, a network appliance, a blade computer, a storage server, a storage controller, etc. Each of the storage pools 104a . . . 104n may comprise one or more storage units, wherein in certain embodiments the exemplary storage pool 104a may be configured to be of type RAID-5, and the exemplary storage pool 104n may be configured to be of type RAID-1. RAID provides increased storage functions and reliability through redundancy by combining a plurality of disk drive components into a logical unit, where data is distributed across the drives in one of several ways called "RAID levels". In RAID-1 level (also referred to as mirroring without parity or striping), data is written identically to a plurality of disks. In RAID-5 level (also referred to as block-level striping with distributed parity), parity is distributed along with the data. RAID-5 requires all drives but one to be present to operate. In RAID-5, drive failure requires replacement, but the RAID-5 array is not destroyed by a single drive failure.

The computational device 102 is configured to execute a LUN allocating application 108 and a listener application 110. The computational device 102 also has access to data structures corresponding to a desired LUN 112, a desired storage pool type 114, a first indicator 116 and a second indicator 118. The LUN allocating application 108 and the listener application 110 may coordinate with each other and interpret the data structures 112, 114, 116, 118 to store and move LUNs 120a . . . 120p, 122a . . . 122q among the storage pools 104a . . . 104n.

Figure 2:
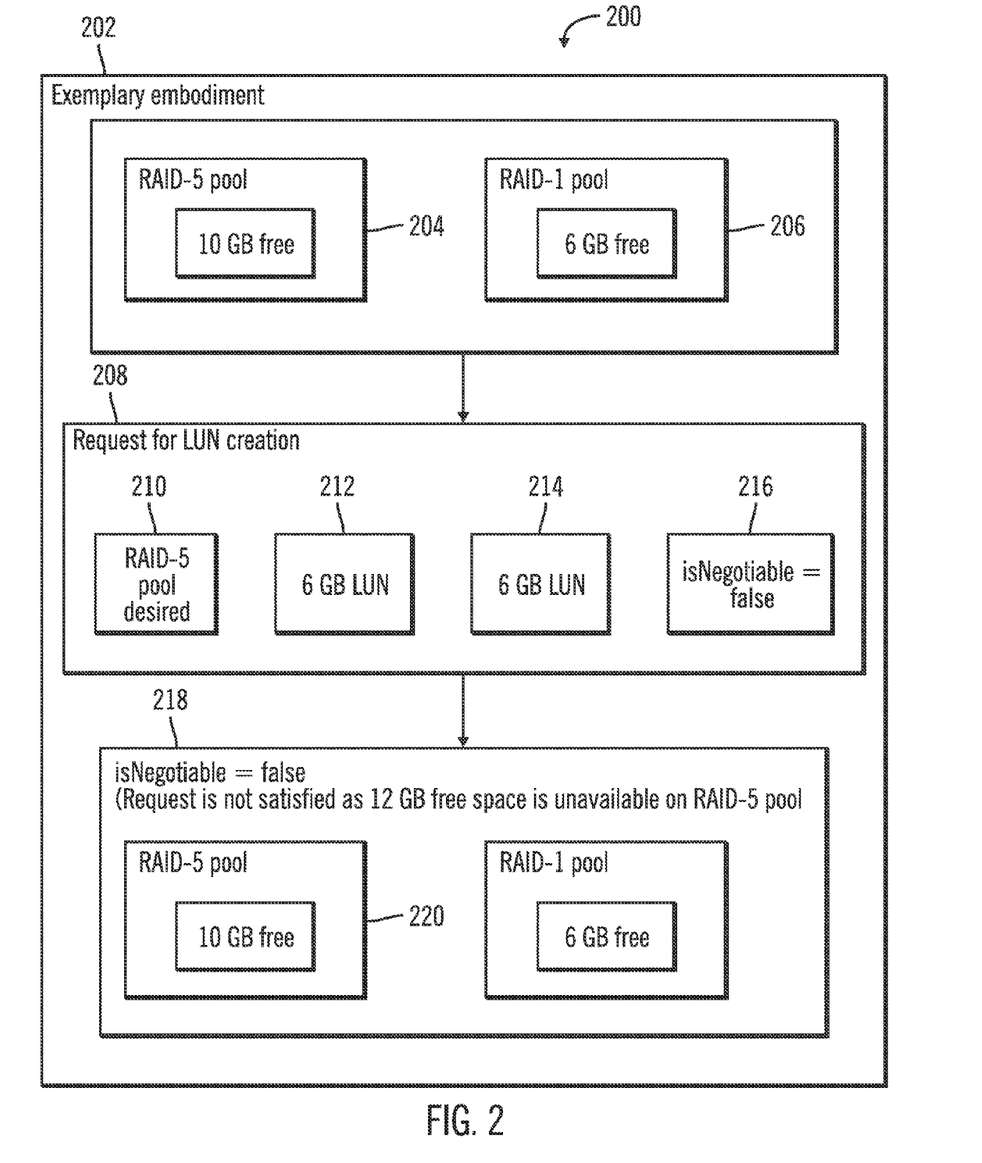
FIG. 2 illustrates a block diagram that shows a first exemplary embodiment in which an "isNegotiable" indicator is set to "false", in accordance with certain embodiments.

FIG. 2 illustrates a block diagram 200 that shows a first exemplary embodiment 202 in which an "isNegotiable" indicator that corresponds to the second indicator 118 (shown in FIG. 1) is set to "false", in accordance with certain embodiments.

In the first exemplary embodiment 202, the computational device 102 (shown in FIG. 1) may be coupled to two storage pools indicated by a RAID-5 pool 204 with 10 GB of free space, and a RAID-1 pool with 6 GB of free space. Thus, storage pool 204 is of type RAID-5 and has 10 GB of free storage space and storage pool 206 is of type RAID-1 and has 6 GB of free storage space.

The computational device 102 (of FIG. 1) may receive a request 208 for LUN creation from a user. The request 208 may indicate that the desired storage pool type 114 is of type RAID-5 210, the desired LUNs 112 are a first 6 GB LUN 212 and a second 6 GB LUN 214. In the exemplary embodiment shown in FIG. 2, the second indicator 118 (of FIG. 1) may correspond to an "isNegotiable" indicator 216 that is set to "false". Setting the "isNegotiable" indicator to "false" means that if the desired type of storage pool is not available, then alternate storage pool may not be used to create a LUN.

Since "isNegotiable" is set to "false", in the exemplary embodiment 202, the request for LUN creation is not satisfied 218 as the total storage space requested via the first 6 GB LUN 212 and the second 6 GB LUN 214 is 12 GB on a RAID-5 pool. However, the RAID-5 pool (shown via reference numeral 220) has only 10 GB of free space which is not adequate to satisfy the request 208 for LUN creation.

Figure 3:
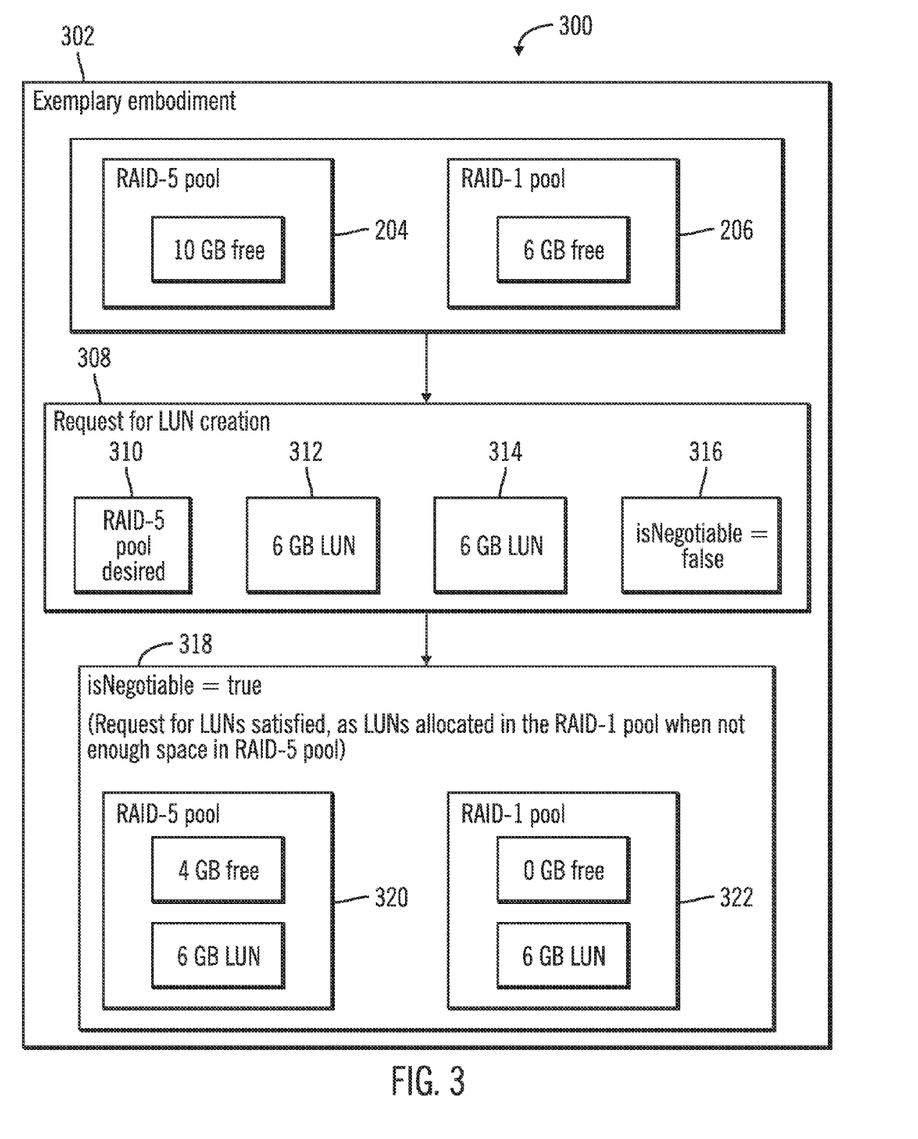
FIG. 3 illustrates a block diagram that shows a second exemplary embodiment in which an "isNegotiable" indicator is set to "true", in accordance with certain embodiments.

FIG. 3 illustrates a block diagram 300 that shows a second exemplary embodiment 302 in which an "isNegotiable" indicator that corresponds to the second indicator 118 (shown in FIG. 1) is set to "true", in accordance with certain embodiments;

In the second exemplary embodiment 202, the computational device 102 (shown in FIG. 1) may be coupled to two storage pools indicated by a RAID-5 pool 204 with 10 GB of free space, and a RAID-1 pool with 6 GB of free space.

The computational device 102 (of FIG. 1) may receive a request 308 for LUN creation from a user. The request 308 may indicate that the desired storage pool type 114 is of type RAID-5 310, the desired LUNs 112 are a first 6 GB LUN 312 and a second 6 GB LUN 314. In the exemplary embodiment shown in FIG. 3, the second indicator 118 may correspond to an "isNegotiable" indicator 316 that is set to "true". Setting the "isNegotiable" indicator to "true" means that if the desired type of storage pool is not available, then alternate storage pool may be used to create a LUN.

Since "isNegotiable" is set to "true", in the exemplary embodiment 302, the request for LUN creation is satisfied 318, by first allocating the first 6 GB LUN 312 to the RAID-5 pool 320, and then when adequate space is not found in the RAID-5 pool 302, allocating the second 6 GB LUN 314 to the RAID-1 pool 322.

Figure 4:
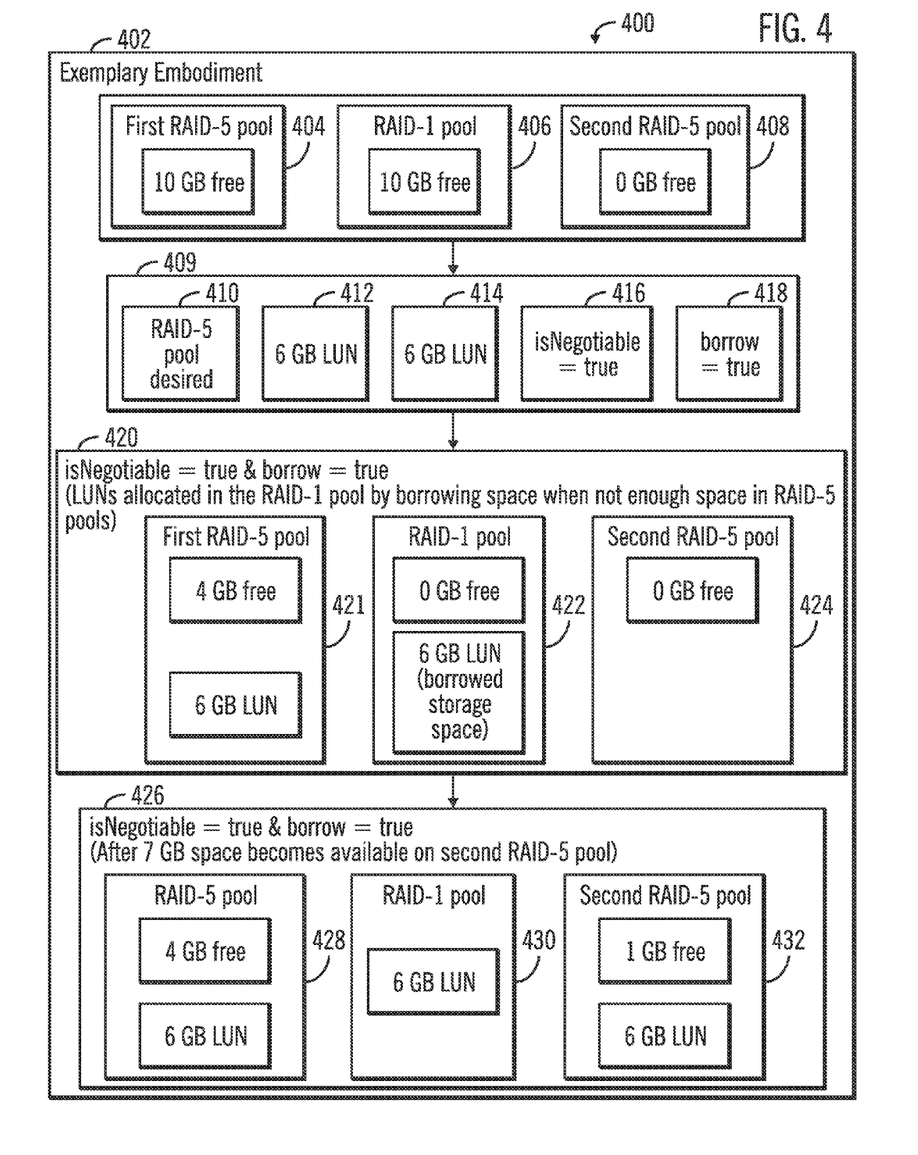
FIG. 4 illustrates a block diagram that shows a third exemplary embodiment in which an "isNegotiable" indicator is set to "true" and a "borrow" indicator is set to "true", in accordance with certain embodiments.

FIG. 4 illustrates a block diagram 400 that shows a third exemplary embodiment 402 in which an "isNegotiable" indicator is set to "true" and a "borrow" indicator is set to "true", in accordance with certain embodiments.

In the third exemplary embodiment 402, the computational device 102 (shown in FIG. 1) may be coupled to three storage pools indicated by a first RAID-5 pool 404 with 10 GB of free space, a RAID-1 pool 406 with 6 GB of free space, and a second RAID-5 pool 408 with no free space.

The computational device 102 (of FIG. 1) may receive a request 408 for LUN creation from a user. The request 408 may indicate that the desired storage pool type 114 is of type RAID-5 410, the desired LUNs 112 are a first 6 GB LUN 412 and a second 6 GB LUN 414. In the exemplary embodiment shown in FIG. 4, the second indicator 118 may correspond to an "isNegotiable" indicator 416 that is set to "true", and the first indicator 116 may correspond to a "borrow" indicator 418 that is also set to "true". Setting the "isNegotiable" indicator 416 to "true" means that if the desired type of storage pool is not available, then alternate storage pool may be used to create a LUN. Setting the "borrow" indicator 418 to "true" means that if the desired type of storage pool is not available, then storage space may be borrowed from an alternate storage pool to create the LUN, and then when storage space of the desired type becomes available the LUN is moved from the alternate storage pool to the desired type of storage pool.

Since "isNegotiable" is set to "true" and "borrow" is also set to "true", in the exemplary embodiment 402, the request for LUN creation is satisfied (shown in block 420), by first allocating the first 6 GB LUN 412 to the first RAID-5 pool 420, and then when adequate space is not found in the RAID-5 pools 420, 424, borrowing 6 GB of storage space from the RAID-1 pool 422 to allocate the second 6 GB LUN 414 to the RAID-1 pool 422.

Subsequently in block 426, in the exemplary embodiment 402, 7 GB of storage space becomes available in the second RAID-5 pool 432 (which is the same as the second RAID-5 pool 408, 424). The borrowed storage space in the RAID-1 pool 430 is released and the second 6 GB LUN is moved to the second RAID-5 pool 432 which is of the type desired by the request 408. The first RAID-5 pool 428 continues to store the first 6 GB LUN.

Figure 5:
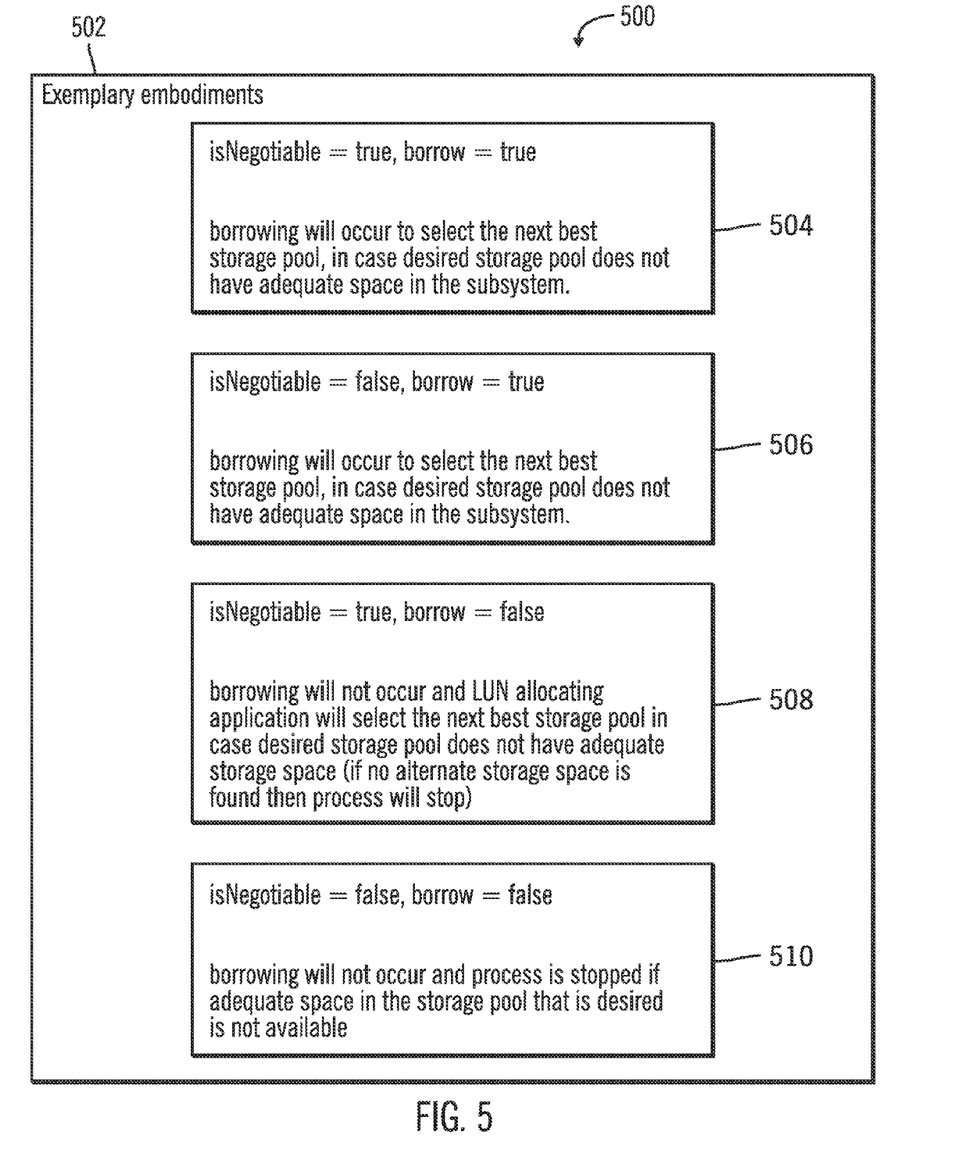
FIG. 5 illustrates a block diagram that shows fourth exemplary embodiments for various configurations of the "isNegotiable" and "borrow" indicators, in accordance with certain embodiments.

FIG. 5 illustrates a block diagram 500 that shows fourth exemplary embodiments 502 for various configurations of the "isNegotiable" and "borrow" indicators, in accordance with certain embodiments.

Certain embodiments can implement the following combinations and corresponding operations for the first indicator ("borrow") and the second indicator ("isNegotiable") as shown in FIG. 5:

(a) "isNegotiable is set to "true" AND "borrow" is set to "true": borrowing will take place to select the next best pool in case the desired pool does not have adequate space in the storage subsystem comprising the storage pools (reference numeral 504);

(b) "isNegotiable" is set to "false" AND "borrow" is set to "true": borrowing will take place to select the next best pool in case the desired pool does not have adequate space in the storage subsystem comprising the storage pools (reference numeral 506);

(c) "isNegotiable" is set to "true" AND "borrow" is set to "false": borrowing will not take place and process will select the next best pool in case desired pool does not have adequate space (if no alternate storage space is found then process will stop) (reference numeral 508);

(d) "isNegotiable" is set to "false" AND "borrow" is set to "false": borrowing will not take place and process is stopped if adequate space in the pool that is desired is not available (reference numeral 510).

Figure 6:
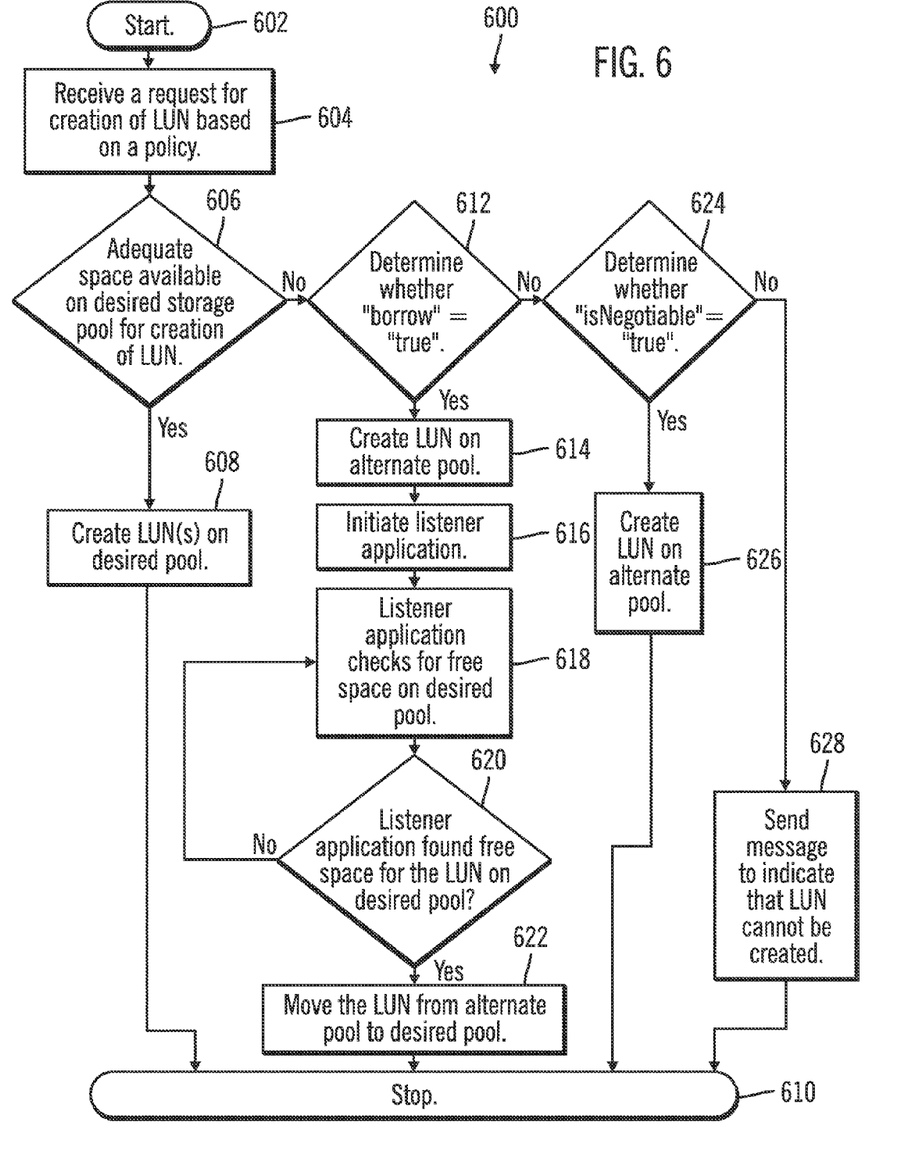
FIG. 6 illustrates a flowchart that shows first operations performed by the computational device, in accordance with certain embodiments.

FIG. 6 illustrates a flowchart 600 that shows first operations performed by a computational device 102, in accordance with certain embodiments. In certain embodiments, the first operations may be performed by the LUN allocating application 108 and the listener application 110.

Control starts at block 602, and proceeds to block 604 in which the computational device 102 receives a request for creation of at least one LUN based on a policy, wherein the policy includes configurations for the "borrow" 116, "isNegotiable" 118 indicators, and the desired storage pool type 114. For example, in certain embodiments, a user may set the policy by giving preference to some desired high redundancy RAID level pool (e.g., RAID-5) and the "loan' indicator" may be set to "true".

From block 604, control proceeds to block 606 in which the LUN allocating application 108 determines whether adequate space is available in the desired storage pool for creation of the LUN. If so, the LUN allocating application 108 creates (at block 608) the LUN in the desired pool. If not, the LUN allocating application 108 determines (at block 612) whether the "borrow" indicator is set to be "true". If so, the LUN allocating application 108 creates (at block 614) the LUN on an alternate pool (e.g., a next best pool to substitute the desired pool) and initiates (at block 616) the listener application 110. Control proceeds to block 618 in which the listener application 110 checks for free space pool that is adequate for storing the LUN in the desired pool. If the listener application 110 finds (at block 620) free space that is adequate for storing the LUN in the desired pool, then the LUN allocating application 108 is notified by the listener application 110, and the LUN allocating application 108 moves (at block 622) the LUN from the alternate pool to the desired pool and frees up space in the alternate pool. If at block 620, the listener application 110 determines that no free space that is adequate to store the LUN in the desired pool has been found, control returns to block 618 for the listener application 110 to check once again for free space that is adequate to store on LUN in the desired pool.

If at block 612, it is determined that the "borrow" indicator has not been set to true, control proceeds to block 624 in which the LUN allocating application 108 determines whether the "isNegotiable" indicator has been set to be "true". If so, then the LUN allocating application 108 creates (at block 626) the LUN on an alternate pool that may be the next best pool to substitute the desired pool. If not, the LUN allocating application 108 sends (at block 628) a message to indicate that the LUN cannot be created.

In FIG. 6, from blocks 608, 622, 626, 628 control proceeds to block 610 where the process stops, and subsequently the process may start once again at block 602.

Figure 7:
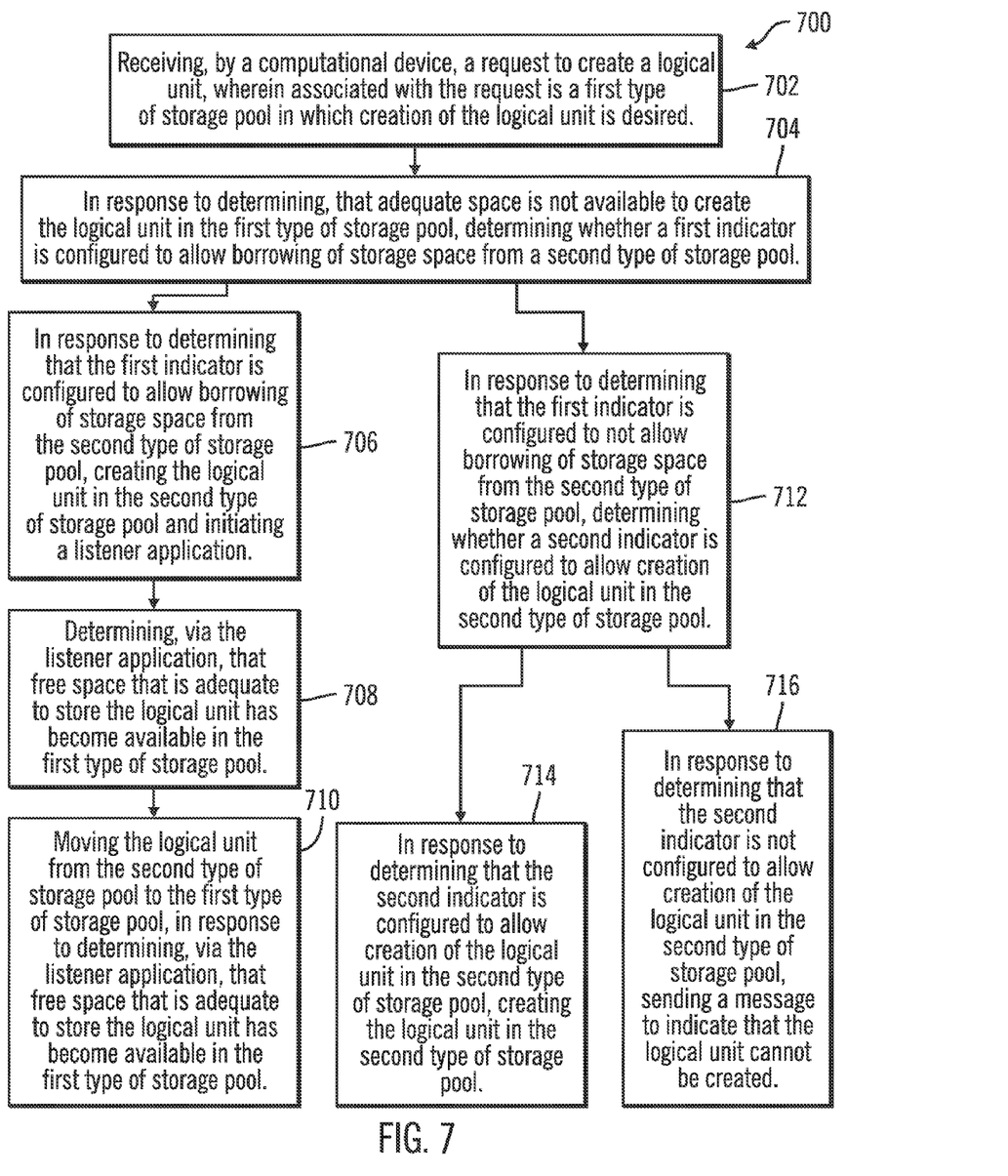
FIG. 7 illustrates a flowchart that shows second operations performed by the computational device, in accordance with certain embodiments.

FIG. 7 illustrates a flowchart 700 that shows second operations performed by the computational device 102, in accordance with certain embodiments. In certain embodiments, the second operations may be performed by the LUN allocating application 108 and the listener application 110.

Control starts at block 702 in which a computational device 102 receives a request to create a logical unit, wherein associated with the request is a first type of storage pool 114 in which creation of the logical unit is desired. In response to determining (at block 704) that adequate space is not available to create the logical unit in the first type of storage pool, a determination is made as to whether a first indicator 116 (e.g., "borrow" indicator) is configured to allow borrowing of storage space from a second type of storage pool. In certain embodiments, the second type of storage pool is a next best type of storage pool that may potentially be substituted for the first type of storage pool, at least for a limited period of time.

In certain embodiments, from block 704 control may proceed to block 706, wherein in block 706, in response to determining that the first indicator 116 is configured to allow borrowing of storage space from the second type of storage pool, the logical unit is created in the second type of storage pool 104n, and a listener application 110 is initiated. The listener application 110 determines (at block 708) that free space that is adequate to store the logical unit has become available in the first type of storage pool 104a. The logical unit is moved (at block 710) from the second type of storage pool 104n to the first type of storage pool 104a, in response to determining, via the listener application 110, that free space that is adequate to store the logical unit has become available in the first type of storage pool 104a.

In certain embodiments, from block 704 control may proceed to block 712, wherein in block 712, in response to determining that the first indicator 116 is configured to not allow borrowing of storage space from the second type of storage pool 104n, a determination is made as to whether a second indicator 118 (e.g., "isNegotiable" indicator) is configured to allow creation of the logical unit in the second type of storage pool 104n.

In certain embodiments, from block 712, control may proceed to block 714, wherein in block 714, in response to determining that the second indicator 118 is configured to allow creation of the logical unit in the second type of storage pool 104n, the logical unit is created in the second type of storage pool 104n.

In additional embodiments, from block 712, control may proceed to block 716, wherein in block 716, in response to determining that the second indicator 118 is not configured to allow creation of the logical unit in the second type of storage pool 104n, a message is sent to indicate that the logical unit cannot be created.

In certain embodiments, from block 710, 714, and 716 control may return (not shown in FIG. 7) to block 702 to process another request to create another logical unit.

Therefore, FIG. 7 illustrates certain embodiments in which the first indicator (i.e., the "borrow" indicator) 116 has precedence over the second indicator (i.e., the "isNegotiable" indicator) 118. In certain embodiments, if the first indicator is set to be "true", borrowing of storage space is allowed irrespective of whether or not the second indicator is set to be "true".

In certain embodiments, in case of capacity constraints in storage subsystems, whatever RAID choice is desired by the user is provided to him at some later time, even if the RAID choice is not available currently. The first and second indicators may be configured by default, such that, the first indicator is at least set to "true", and the user may not need to configure the first indicator or the second indicator. As a result, data may be copied without the user being informed of any capacity overflow issues and over a period of time if the desired choice of RAID pool is available then the desired choice of RAID pool will be utilized. Thus, high availability and high redundancy of data may be maintained even if it means a temporary period of low availability or low redundancy. For example, data may be stored on RAID-1 pool (low redundancy level) for some time before freeing the RAID-1 pool up and moving the data to a RAID-5 pool (high redundancy level).

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). *Java is a trademark or registered trademark of Sun Microsystems, Inc.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
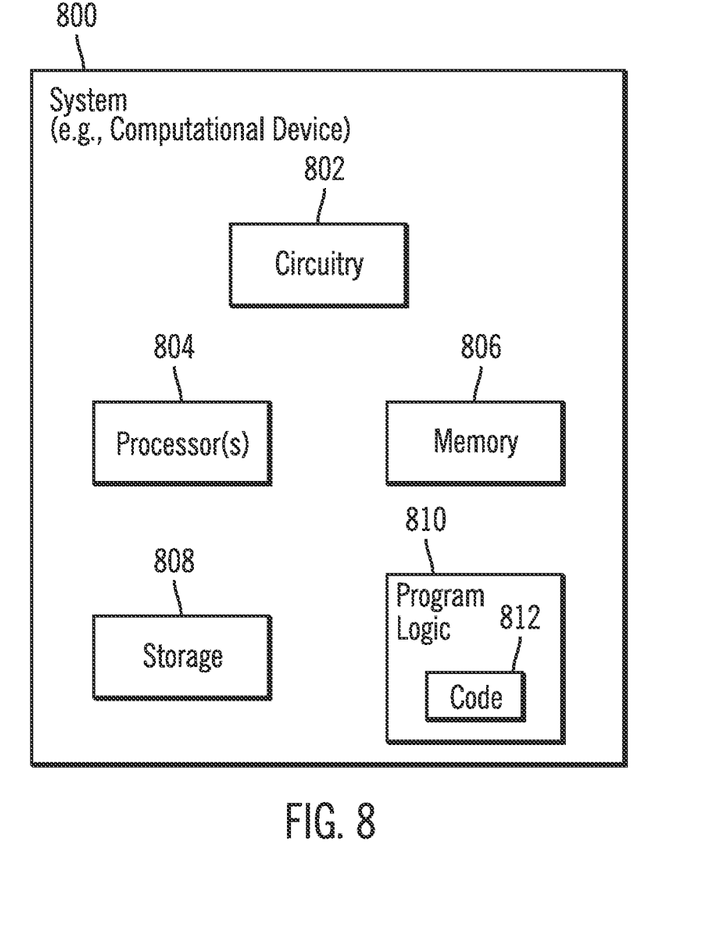
FIG. 8 illustrates a block diagram of a computational system that shows certain elements that may be included in the computing environment of FIG. 1, in accordance with certain embodiments.

FIG. 8 illustrates a block diagram that shows certain elements that may be included in the system 800 in accordance with certain embodiments. The system 800 may comprise the computational device 102, and may include a circuitry 802 that may in certain embodiments include at least a processor 804. The system 800 may also include a memory 806 (e.g., a volatile memory device), and storage 808. The storage 808 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. Therefore, while FIG. 8 shows the program logic 810 separately from the other elements, the program logic 810 may be implemented in the memory 806 and/or the circuitry 802.

In certain embodiments, the computational device 102 and the storage pools 104a . . . 104n of FIG. 1 may be cloud component parts included in a cloud computing environment. In the cloud computing environment the systems architecture of the hardware and software components involved in the delivery of cloud computing may involve a plurality of cloud components communicating with each other.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A method, comprising:
   maintaining, in a computational device, a first indicator that is configurable to indicate whether storage space can be borrowed from an alternate type of storage pool, and a second indicator that is configurable to indicate whether the alternate type of storage pool can be used for logical unit creation;
   in response to determining that adequate space is not available to create a logical unit in a first type of storage pool and the first indicator is configured to allow borrowing of storage space from a second type of storage pool, creating the logical unit in the second type of storage pool; and
   subsequent to creating the logical unit in the second type of storage pool, moving the logical unit from the second type of storage pool to the first type of storage pool, in response to determining that free space that is adequate to store the logical unit has become available in the first type of storage pool.

2. The method of claim 1, wherein in response to the first indicator being configured to allow borrowing of storage space from the second type of storage pool, and a second indicator being configured to allow creation of the logical unit in the second type of storage pool, borrowing is performed to select a next best pool in case the first storage pool comprising a desired storage pool does not have adequate space in a storage subsystem.

3. The method of claim 1, wherein in response to the first indicator being configured to allow borrowing of storage space from the second type of storage pool, and a second indicator being configured to not allow creation of the logical unit in the second type of storage pool, borrowing is performed to select a next best pool in case the first storage pool comprising a desired storage pool does not have adequate space in a storage subsystem.

4. A method comprising:
maintaining, in a computational device, a first indicator that is configurable to indicate whether storage space can be borrowed from a second type of storage pool, and a second indicator that is configurable to indicate whether the second type of storage pool can be used for logical unit creation; and
in response to the first indicator being configured not to allow borrowing of storage space from the second type of storage pool, and the second indicator being configured to allow creation of the logical unit in the second type of storage pool, borrowing is not performed, and performing selection of a next best pool in case the first storage pool comprising a desired pool does not have adequate space in a storage subsystem.

5. A system, comprising:
a memory; and
a processor coupled to the memory, wherein the processor performs operations, the operations comprising:
maintaining a first indicator that is configurable to indicate whether storage space can be borrowed from an alternate type of storage pool, and a second indicator that is configurable to indicate whether the alternate type of storage pool can be used for logical unit creation;
in response to determining that adequate space is not available to create a logical unit in a first type of storage pool and the first indicator is configured to allow borrowing of storage space from a second type of storage pool, creating the logical unit in the second type of storage pool; and
subsequent to creating the logical unit in the second type of storage pool, moving the logical unit from the second type of storage pool to the first type of storage pool, in response to determining that free space that is adequate to store the logical unit has become available in the first type of storage pool.

6. The system of claim 5, wherein in response to the first indicator being configured to allow borrowing of storage space from the second type of storage pool, and a second indicator being configured to allow creation of the logical unit in the second type of storage pool, borrowing is performed to select a next best pool in case the first storage pool comprising a desired storage pool does not have adequate space in a storage subsystem.

7. The system of claim 5, wherein in response to the first indicator being configured to allow borrowing of storage space from the second type of storage pool, and a second indicator being configured to not allow creation of the logical unit in the second type of storage pool, borrowing is performed to select a next best pool in case the first storage pool comprising a desired storage pool does not have adequate space in a storage subsystem.

8. A system, comprising:
a memory; and
a processor coupled to the memory, wherein the processor performs operations, the operations comprising:
maintaining a first indicator that is configurable to indicate whether storage space can be borrowed from a second type of storage pool, and a second indicator that is configurable to indicate whether the second type of storage pool can be used for logical unit creation; and
in response to the first indicator being configured not to allow borrowing of storage space from the second type of storage pool, and the second indicator being configured to allow creation of the logical unit in the second type of storage pool, borrowing is not performed, and performing selection of a next best pool in case the first storage pool comprising a desired pool does not have adequate space in a storage subsystem.

9. A computer program product, the computer program product comprising:
a computer readable storage medium having computer readable program code embodied therewith, the computer readable program code configured to perform operations, the operations comprising:
maintaining a first indicator that is configurable to indicate whether storage space can be borrowed from an alternate type of storage pool, and a second indicator that is configurable to indicate whether the alternate type of storage pool can be used for logical unit creation;
in response to determining that adequate space is not available to create a logical unit in a first type of storage pool and the first indicator is configured to allow borrowing of storage space from a second type of storage pool, creating the logical unit in the second type of storage pool; and
subsequent to creating the logical unit in the second type of storage pool, moving the logical unit from the second type of storage pool to the first type of storage pool, in response to determining that free space that is adequate to store the logical unit has become available in the first type of storage pool.

10. The computer program product of claim 9, wherein in response to the first indicator being configured to allow borrowing of storage space from the second type of storage pool, and a second indicator being configured to allow creation of the logical unit in the second type of storage pool, borrowing is performed to select a next best pool in case the first storage pool comprising a desired storage pool does not have adequate space in a storage subsystem.

11. The computer program product of claim 9, wherein in response to the first indicator being configured to allow borrowing of storage space from the second type of storage pool, and a second indicator being configured to not allow creation of the logical unit in the second type of storage pool, borrowing is performed to select a next best pool in case the first storage pool comprising a desired storage pool does not have adequate space in a storage subsystem.

12. A computer program product, the computer program product comprising:
a computer readable storage medium having computer readable program code embodied therewith, the computer readable program code configured to perform operations, the operations comprising:

maintaining, in a computational device, a first indicator that is configurable to indicate whether storage space can be borrowed from a second type of storage pool, and a second indicator that is configurable to indicate whether the second type of storage pool can be used for logical unit creation; and in response to the first indicator being configured not to allow borrowing of storage space from the second type of storage pool, and the second indicator being configured to allow creation of the logical unit in the second type of storage pool, borrowing is not performed, and performing selection of a next best pool in case the first storage pool comprising a desired pool does not have adequate space in a storage subsystem.

\* \* \* \* \*